Patented Oct. 13, 1953

2,655,526

UNITED STATES PATENT OFFICE 2,655,526

PREPARATION OF MONO-ALKYL OR -ARALKYL CYANOACETIC ACID ESTERS

Arthur C. Cope, Belmont, Mass., assignor to Merck & Co., Inc., a corporation of New Jersey No Drawing. Application March 1, 1949, Serial No. 79,115

8 Claims. (Cl. 260—464)

This invention relates to an improved process for preparing mono-alkyl or -aralkyl cyanoacetic alkyl or aralkyl esters, including both the primary and the secondary derivatives, from aliphatic or aromatic or aliphatic aromatic ketones or aliphatic or aromatic or aralkyl aldehydes, by reacting such ketone or aldehyde with an alkyl cyanoacetate in the presence of a condensing agent and under reduction or hydrogenation conditions.

The process of the invention may be illustrated by the following equation:

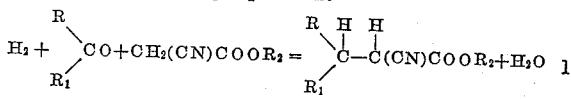

wherein R is selected from hydrogen and alkyl, aryl and aralkyl radicals; and R₁ is selected from alkyl, aryl and aralkyl radicals; and R₂ is selected from alkyl and aralkyl radicals.

The process is of particular advantage for the production of the mono-alkyl cyanoacetic esters in which the mono-alkyl group is lower as well as higher alkyl as the hexyl, heptyl, octyl and the like radicals, and even higher, including both straight and branched chain alkyl. In general, the mono-alkyl or -aralkyl derivatives resulting from the procedure are saturated in the aliphatic portions thereof and without any hydrogenation of any benzene radicals which they may contain.

A wide range of ketones may be condensed with cyanoacetic esters in accordance with the present invention, including open chain ketones, such as acetone, methylethyl ketone, methyl-n-propyl ketone, methyl-n-amyl ketone, di-n-propyl ketone, mesityl oxide, diethyl ketone, and the like, as well as cyclic ketones, such as cyclohexanone, cyclopentanone, and the like, and aryl ketones, such as acetophenone, propiophenone, butyrophenone, and the like.

A similar wide range of aldehydes may be condensed with the alkyl or aralkyl cyanoacetic esters, including open chain aldehydes, straight or branched, such as acetaldehyde, propionaldehyde, butyraldehyde, isobutyraldehyde, heptaldehyde, as well as cyclic aldehydes as cyclopentylaldehyde, cyclohexylaldehyde and the like, and including aryl aldehydes such as benzaldehyde and the like.

The alkyl or aralkyl radical (R₂ above) in the cyanoacetic alkyl or aralkyl ester starting material may be any suitable alkyl group such as hereinabove indicated for the other alkyl groups and advantageously a lower alkyl group, or any suitable aralkyl group as benzyl, and the like.

In general, the invention includes the reaction when carried out in the presence of a suitable condensing agent consisting of a soluble salt, advantageously a soluble salt of a nitrogen base (which may be primary, secondary, or tertiary), i. e. an ammonium or amine base or an alkali metal salt of an organic acid, or an acid amide, such as acetamide. Preferably, the salts which are used are the acetates of the bases, such as diethylamine acetate, monoethylamine acetate, triethylamine acetate, ammonium acetate, piperidine acetate and the like. Compounds or condensing agents which have been found to have important advantages for carrying out the condensation are the acetates of primary or secondary amines, or even tertiary amines particularly with the aldehydes, or ammonium acetate, which enable the condensation to be accomplished with particularly good yields of the desired product in fairly pure state and with a minimum of side reactions, polymerization, etc. Ammonium acetate, on heating, is converted into acetamide. This substance, which may be formed in situ in certain of the reaction mixtures in which ammonium acetate is used as the catalyst, is in itself a good catalyst for these reactions, and may be introduced directly into the reaction mixture to effect the condensation; or, solutions of soluble salts in acetamide may be used with advantage.

In this specification and the appending claims, the expression "an ammonia base" is used in its generic sense to embrace ammonia or ammonium hydroxide and the primary, secondary, and tertiary amines, as referred to at lines 10–12 above, and when the term "amine" is used without the specific modifying adjective, primary, secondary, or tertiary, the term is used in its generic sense embracing all three forms.

The process of producing the mono-alkyl or -aralkyl cyanoacetic alkyl or aralkyl esters may comprise having together in the reaction mixture solely (1) a ketone or an aldehyde, (2) a cyanoacetic alkyl ester, (3) a condensing agent and (4) a hydrogenation catalyst while simultaneously introducing hydrogen as a reducing agent, or the reaction mixture may also contain an organic acid, such as the organic acids of the acetic acid series, for which purpose acetic acid is particularly important. In place of acetamide in such an acid solution, other amides and other soluble salts may be used, with improved results as compared with the use of such soluble salts and amides alone. When the reaction is carried out in the presence of an acid such as acetic acid, an additional solvent, such as benzene or other inert solvent may be used, or the acid itself may be used as the solvent. As indicated above, however, it is not necessary that an acid be used in the reaction medium, as the reaction will also proceed without either the acid or the solvent, or, if desired, the inert solvent alone may be added to the reaction medium.

Various catalysts, particularly a hydrogenation catalyst having an activity about the same as that of metals of the platinum and palladium family, including catalysts selected from the group of metals of the platinum and palladium family, such as a noble metal catalyst as platinum and palladium catalysts may be used for the hydrogenation. In this specification and its appending claims, as indicated in the preceding sentence, the expression "hydrogenation catalyst having an activity about the same as that of metals of the platinum and palladium family" includes within the scope of hydrogenation catalysts embraced by the quoted expression also the metals of the platinum and palladium family. A catalyst which is particularly advantageous for the hydrogenation is palladium supported on charcoal. This catalyst may be prepared, for example, by agitating a powdered charcoal, such as pure animal charcoal, with an aqueous solution of palladium chloride in an atmosphere of hydrogen. A suitable proportion is about 1 part of palladium chloride to 6 parts of charcoal. Agitation should be continued until the palladium chloride is reduced and the palladium is deposited on the charcoal. The catalyst may then be filtered off, washed and dried. It is then ready for immediate use in the process, or it may be kept in vacuo over sulfuric acid until used. This catalyst may be used with advantage.

While in the broad aspect, the reaction conditions are generally substantially the same with respect to the carbonyl compound (ketone or aldehyde) starting material selected, the optimum experimental conditions for the reaction vary slightly according to the type of carbonyl compound used. For example, in the examples below which illustrate the reaction in the presence of a solvent, piperidine acetate and acetic acid were employed with particular effectiveness witth the aldehydes, and ammonium acetate and acetic acid was used with the ketones. When ethyl cyanoacetate was reacted with ketones, alcohol served as a most satisfactory solvent for use in carrying out the process of the invention. Dioxane served most satisfactorily as a solvent in reacting ethyl cyanoacetate with higher aldehydes (e. g. isobutyraldehyde, isovaleraldehyde, heptaldehyde and benzaldehyde), with glacial acetic acid serving as a most satisfactory solvent when reacting the lower molecular weight aldehydes as acetaldehyde, propionaldehyde and butryaldehyde. All of such solvents are generically aliphatic oxygenated solvents. The aliphatic oxygenated (that is, oxygen-containing substance) solvents, for example, the acetic acid, alcohol, and dioxane referred to above, are suitable solvents because they are inert under the reaction conditions in which they are employed in that they exercise solely the property of a solvent and vehicle for the reactants but do not enter into the reaction so as to contribute a substituent group in the reaction products.

The invention may be illustrated by, but not restricted to, the following procedures exemplifying the application of the method to each of the three classes referred to in the preceding paragraph:

A. *Lower molecular weight aliphatic aldehydes with ethyl cyanoacetate.*—A mixture of 56.6 grams (0.5 mole) of ethyl cyanoacetate, and 0.6 mole of the freshly distilled selected lower molecular weight aliphatic aldehyde, and 1.0 gram of palladinized charcoal and 80 cc. of glacial acetic acid was placed in a 500 cc. "Pyrex" bottle (with an arrangement for permitting hydrogenation), and to this mixture was added a solution of 2 cc. (0.02 mole) of piperidine in 200 cc. of glacial acetic acid and hydrogenation at a pressure of 1 to 2 atmospheres was begun immediately. Reduction was rapid and exothermic. In 1 to 3 hours the theoretical amount of hydrogen (0.5 mole) was taken up and absorption ceased. The resulting individual ethyl alkylcyanoacetates were isolated by filtering the reaction mixture, adding 50 cc. of benzene to the filtrate and washing the resulting solution with two 50 cc. portions of 10% sodium chloride solution followed by three 25 cc. portions of water. Wherever an emulsion formed at this point, it was broken by the addition of a few cc. of ether. The combined washings were extracted with two small portions of benzene which were then combined with the original benzene solution, and the combined benzene solutions were distilled through a Widmer column under reduced pressure. No ethyl cyanoacetate was recovered in the forerun, and the individual ethyl alkylcyanoacetate was recovered and only a small distillation residue remained, the ethyl alkylcyanoacetate being readily purified by distillation.

When aldol was employed as the starting aldehyde, 0.7 mole of hydrogen were absorbed and 55.5 grams (66%) of ethyl n-butylcyanoacetate was obtained.

B. *Branched chain, higher molecular weight aliphatic aldehydes and benzaldehyde.*—A mixture of 56.6 grams (0.5 mole) of ethyl cyanoacetate, and 0.6 mole of the selected aldehyde, and 6.0 grams (0.05 mole) glacial acetic acid and 150 cc. of dioxane (purified by boiling over sodium for 48 hours and redistilling) was placed in a 500 cc. "Pyrex" bottle, as in Example A, and cooled in an ice salt mixture to 4° C. 2.0 cc. (0.02 mole) of piperidine was added dropwise to the mixture during approximately 10 minutes with occasional swirling. The temperature rose to 20° C. and the solution became turbid. When the addition was complete, 1.0 gram of palladinized charcoal was added and the mixture was hydrogenated as in the preceding example. With the indicated aliphatic aldehydes, heat was evolved and reduction was complete in about 4 hours. With benzaldehyde, hydrogen absorption was fairly slow even when the reaction was carried out at 60° C. The esters were isolated and purified as in the preceding example. In the case of the indicated aliphatic aldehydes, no ethyl cyanoacetate was recovered, and only small distillation residues were left. With benzaldehyde there was a forerun of ethylcyanoacetate (8.0 grams) and appreciable residue (35 grams).

C. *Aliphatic ketones.*—56.6 grams of ethylcyanoacetate (0.5 mole), and 0.55 mole of the selected ketone, and 3.9 grams of ammonium acetate (0.05 mole), and 6.0 grams (0.1 mole) of glacial acetic acid, and 100 cc. of 95% ethanol and 1.0 gram of palladinized charcoal were placed in a 500 cc. "Pyrex" bottle and hydrogenated as in the preceding examples. The reactions with the ketones were also exothermic but to a lesser degree than with the aldehydes of the preceding examples. The esters were isolated and purified as in Example A.

While the dioxane and the ethanol employed respectively as the solvent in the preceding Examples B and C were each used along with glacial acetic acid, just as glacial acetic acid was used alone as the solvent in the preceding Example A, thus either the dioxane or the ethanol may likewise be used alone as the solvent as illustrated by, but not restricted to, the following examples:

D. *Aliphatic ketone with dioxane.*—To a solution of 22.6 grams (0.2 mole) of ethyl cyanoacetate, 17.4 grams (0.3 mole) of acetone, and 0.3 grams (0.004 mole) of ammonium acetate, in 30 cc. of dioxane in apparatus as in Example A, there was added one gram of ten per cent palladinized charcoal catalyst, and the mixture was shaken with hydrogen at room temperature until one molar equivalent of hydrogen was absorbed, which occurred after three hours and under six hours. The reaction mixture was filtered and the filtrate distilled giving a yield of 22.1 grams (87%) of ethyl isopropylcyanoacetate boiling at 98.5° C. at 10 mm.

E. *Aliphatic ketone with ethanol.*—To a solution of 22.6 grams (0.2 mole) of ethyl cyanoacetate, 17.4 grams (0.3 mole) of acetone, and 0.3 grams (0.004 mole) of ammonium acetate, in 30 cc. of ninety-five per cent alcohol in apparatus as in Example A, there was added one gram of ten per cent palladinized charcoal catalyst, and the mixture was shaken with hydrogen at room temperature until one molar equivalent of hydrogen was absorbed, which occurred after one hour and under six hours. The reaction mixture was filtered and the filtrate distilled giving a yield of 23.6 grams (93%) of ethyl isopropylcyanoacetate boiling at 98.5° C. at 10 mm.

The following procedure exemplifies the method of producing the mono-alkyl or -aralkyl cyanoacetic alkyl or aralkyl ester in which no solvent is used in the reaction medium:

F. *Reaction mixture containing no solvent.*—56.6 grams (0.5 mole) of ethyl cyanoacetate, 32 grams (0.55 mole) of acetone, 3.9 grams (0.05 mole) of ammonium acetate, 1.0 gram of palladinized charcoal catalyst were placed in a 250 cc. "Pyrex" bottle and hydrogenated at a pressure of one to two atmospheres. After about six hours hydrogen absorption ceased. The catalyst was separated by filtration and washed with 50 cc. of benzene. The water formed in the condensation-reduction (8.5 cc.) was separated from the benzene solution, which was then washed with sodium chloride solution, water, and distilled under reduced pressure. The distillate was washed with dilute hydrochloric acid and water and redistilled, and yielded 56.8 grams (73%) of ethyl isopropylcyanoacetate, B. P. 86° (5.5 mm.), 70° (2 mm.), $n_D^{25}$ 1.4203.

The ethyl monoalkylcyanoacetates obtained according to the preceding examples are represented by the formula RCH(CN)COOC$_2$H$_5$, in which R represents the alkyl group attached as a result of the method of the invention to the methylene carbon of the starting ethyl cyanoacetate, and are identified by the alkyl group in the following table, which also includes the ketone or aldehyde used as starting material:

ACCORDING TO PROCEDURE OF EXAMPLE A

| Alkyl group, R | Ketone or aldehyde used in preparation | Reaction time (hrs.) | Boiling pt. °C. | Mm. |
|---|---|---|---|---|
| Ethyl | Acetaldehyde | 2.5 | 84– 85 | 7 |
| n-Propyl | Propionaldehyde | 3 | 95– 96 | 8 |
| n-Butyl | Butyraldehyde | 1.3 | 108–109 | 8 |

ACCORDING TO PROCEDURE OF EXAMPLE B

| Alkyl group, R | Ketone or aldehyde used in preparation | Reaction time (hrs.) | Boiling pt. °C. | Mm. |
|---|---|---|---|---|
| Isobutyl | Isobutyraldehyde | 4 | 98– 99 | 7 |
| Isoamyl | Isovaleraldehyde | 4 | 113–114 | 7 |
| n-Heptyl | Heptaldehyde | 4 | 111–113 | 1 |
| Benzyl | Benzaldehyde | 16 | 118–122 | .4 |

ACCORDING TO PROCEDURE OF EXAMPLE C

| Alkyl group, R | Ketone or aldehyde used in preparation | Reaction time (hrs.) | Boiling pt. °C. | Mm. |
|---|---|---|---|---|
| Isopropyl | Acetone | 5–6 | 89– 91 | 8 |
| Sec. butyl | Methylethyl ketone | 4.5–6 | 99–100 | 7 |
| 1-methylbutyl | Methylpropyl ketone | 11 | 111–112 | 8 |
| Cyclohexyl | Cyclohexanone | 4–6 | 138–139 | 8 |
| 1,3-dimethylbutyl | Methylisobutyl ketone | 8–11 | 117–119 | 8 |
| 1-methylhexyl | Methylamyl ketone | 9 | 135–137 | 8 |
| 4-heptyl | Dipropyl ketone | 7–22 | 131–132 | 7 |
| 1-methylheptyl | Methylhexyl ketone | 5–6 | 112–115 | 1.0 |

In the preceding table, the products resulting from using heptaldehyde, methylisobutyl ketone, methylamyl ketone, and methylhexyl ketone as the carbonyl compound starting material are new compounds suitable for use as intermediates for other chemically useful substances.

While the invention has been illustrated by the above specific procedures involving the use of piperidine and ammonium acetate as the condensation catalyst, other nitrogen bases or ammonium salts of organic acids, particularly the salts of nitrogen bases, with or without acetic acid or other acids, may be used with advantage. In general, the effectiveness of a salt as a condensing agent or catalyst in the process of the invention depends to a reasonable measure upon its solubility in the reaction mixture. Condensation catalysts which are typical of those used in accordance with the invention and which may be used with advantage are ethylene diamine diacetate, diethanolamine acetate, aniline acetate, piperidine butyrate, piperidine oleate, diethylamine acetate, glycine, sodium acetate, and potassium acetate, and the like.

This application is a continuation-in-part of my copending application Serial No. 26,244, filed May 10, 1948, now abandoned, which in turn was a continuation-in-part application of the then copending application Serial No. 539,174, filed June 7, 1944, now abandoned.

While the invention has been demonstrated in relation to certain specific embodiments of it, it is understood that other suitable variations, modifications and substitutions may be made in it within the scope of the appended claims.

I claim:

1. The process of producing a member of the group consisting of mono-alkyl and -aralkyl cyanoacetic alkyl and aralkyl esters, which process comprises having together in a reaction mixture (a) a carbonyl compound of the formula

wherein R is a member of the group consisting of hydrogen, an alkyl and the phenyl radical, and R$_1$ is a member of the group consisting of an alkyl and the phenyl group, (b) a cyanoacetic alkyl ester, (c) an ammonia-derivative condensing agent which is a member of the group consisting of acetamide, ammonium acetate, and a fatty acid salt of a nitrogen base (in which base any radical attached to the nitrogen is hydrocarbon, with a total of no more than six carbon atoms in all of said hydrocarbon), and (d) a hydrogenation catalyst which is a member of the group consisting of platinum and palladium; and allowing the carbonyl compound to condense with the cyanoacetic alkyl ester in said reaction mixture while simultaneously introducing hydrogen as a reducing agent; and thereafter recovering the end product sought.

2. The process as claimed in claim 1, wherein an inert organic solvent is used which is an aliphatic oxygen-containing solvent.

3. The process of producing a member of the group consisting of mono-alkyl and -aralkyl cyanoacetic alkyl and aralkyl esters, which process comprises having together in a reaction mixture (a) a carbonyl compound of the formula

wherein R is a member of the group consisting of hydrogen, an alkyl and the phenyl radical, and R₁ is a member of the group consisting of an alkyl and the phenyl group, (b) a cyanoacetic alkyl ester, (c) an acetate of an amine (in which any radical attached to the nitrogen is hydrocarbon with a total of no more than six carbon atoms in all of said hydrocarbon), and (d) palladium as a hydrogenation catalyst; and allowing the carbonyl compound to condense with the cyanoacetic alkyl ester in said reaction mixture in the presence of acetic acid while simultaneously introducing hydrogen as a reducing agent, and thereafter recovering the end product sought.

4. The process as claimed in claim 3, wherein the acetate of an amine is piperidine acetate.

5. The process of producing butyl-cyanoacetic ethyl ester, which comprises having together in a reaction mixture butyraldehyde, cyanoacetic ethyl ester, piperidine acetate, all in glacial acetic acid, and palladium on a carrier, and allowing the aldehyde to condense with the cyanoacetic ester while simultaneously introducing hydrogen as a reducing agent; and thereafter recovering the end product sought.

6. The process of producing benzyl-cyanoacetic ethyl ester, which comprises having together in a reaction mixture benzaldehyde, cyanoacetic ethyl ester, piperidine acetate, all in dioxane, and palladium on a carrier, and allowing the aldehyde to condense with the cyanoacetic ester in said reaction mixture in the presence of glacial acetic acid while simultaneously introducing hydrogen acid while simultaneously introducing hydrogen as a reducing agent; and thereafter recovering the end porduct sought.

7. The process of producing a member of the group consisting of monoalkyl and -aralkyl cyanoacetic alkyl and aralkyl esters, which process comprises having together in a reaction mixture (a) a carbonyl compound of the formula

wherein R is a member of the group consisting of hydrogen, an alkyl and the phenyl radical, and R₁ is a member of the group consisting of an alkyl and the phenyl group, (b) a cyanoacetic alkyl ester, (c) ammonium acetate, and (d) palladium as a hydrogenation catalyst; and allowing the carbonyl compound to condense with the cyanoacetic alkyl ester in said reaction mixture in the presence of glacial acetic acid while simultaneously introducing hydrogen as a reducing agent; and thereafter recovering the end product sought.

8. The process of producing cyclohexyl-cyanoacetic ethyl ester, which comprises having together in a reaction mixture cyclohexanone, cyanoacetic ethyl ester, ammonium acetate, all in glacial acetic acid, and palladium on a carrier as a hydrogenation catalyst, and allowing the cyclohexanone to condense with the cyanoacetic ester while simultaneously introducing hydrogen as a reducing agent; and thereafter recovering the end product sought.

ARTHUR C. COPE.

References Cited in the file of this patent

UNITED STATES PATENTS

| Number | Name | Date |
|---|---|---|
| 2,093,519 | Hamann | Sept. 21, 1937 |
| 2,150,154 | Cope | Mar. 14, 1939 |
| 2,176,018 | Cope et al. | Oct. 10, 1939 |
| 2,298,284 | Emerson | Oct. 13, 1942 |
| 2,468,352 | Warner et al. | Apr. 26, 1949 |

FOREIGN PATENTS

| Number | Country | Date |
|---|---|---|
| 162,281 | Germany | July 19, 1905 |